United States Patent
Lee et al.

(10) Patent No.: US 7,545,360 B2
(45) Date of Patent: Jun. 9, 2009

(54) OPTICAL POINTING DEVICE

(75) Inventors: Bang-Won Lee, Yongin-si (KR);
Young-Ho Shin, Yongin-si (KR)

(73) Assignee: Atlab Inc. (KR)

( * ) Notice: Subject to any disclaimer, the term of this patent is extended or adjusted under 35 U.S.C. 154(b) by 465 days.

(21) Appl. No.: 11/074,529

(22) Filed: Mar. 8, 2005

(65) Prior Publication Data
US 2005/0200599 A1    Sep. 15, 2005

(30) Foreign Application Priority Data
Mar. 9, 2004  (KR) .................. 10-2004-0015960

(51) Int. Cl.
  *G09G 5/00* (2006.01)
(52) U.S. Cl. ..................... 345/156; 345/166
(58) Field of Classification Search ......... 345/163–167, 345/156
See application file for complete search history.

(56) References Cited

U.S. PATENT DOCUMENTS

| | | | |
|---|---|---|---|
| 4,857,903 A * | 8/1989 | Zalenski | 345/166 |
| 6,218,659 B1 * | 4/2001 | Bidiville et al. | 250/221 |
| 6,225,981 B1 * | 5/2001 | Lu | 345/164 |
| 6,400,670 B1 * | 6/2002 | Dang | 369/112.1 |
| 2004/0113886 A1 * | 6/2004 | Lee | 345/156 |

FOREIGN PATENT DOCUMENTS

| | | |
|---|---|---|
| CN | 1203686 A | 12/1998 |
| CN | 02240664.6 | 6/2002 |
| KR | 10-2003-0069648 | 10/2003 |

OTHER PUBLICATIONS

Chinese Office Action for Application 2005-10-0535534; Date: Jul. 7, 2006.

* cited by examiner

*Primary Examiner*—Bipin Shalwala
*Assistant Examiner*—Kenneth B Lee, Jr.
(74) *Attorney, Agent, or Firm*—Cantor Colburn LLP

(57) ABSTRACT

An optical pointing device is disclosed. The optical pointing device includes: a case having an opening portion formed on a bottom thereof; a light source installed in the case; an illuminating member for reflecting light emitted from the light source to the exterior through one side of the opening portion of the case; a lens member installed in the case to collect the light which is reflected by the illuminating member and then is reflected from the exterior of the case to enter through the other side of the opening portion; an image sensor installed above the lens member to receive the collected light; and a masking member installed closely to the lens member and having a light collecting hole which exposes a significant surface of the lens member.

8 Claims, 4 Drawing Sheets

OPTICAL POINTING DEVICE

CROSS-REFERENCE TO RELATED APPLICATION

This application claims priority to and the benefit of Korean Patent Application No. 2004-15960, filed on Mar. 9, 2004, the disclosure of which is incorporated herein by reference in its entirety.

BACKGROUND OF THE INVENTION

1. Field of the Invention

The present invention relates to an optical pointing device and, more particularly, to an optical pointing device which improves a structure of a diaphragm to cover portions other than a significant surface of a lens, thereby preventing stray light from entering a lens.

2. Description of the Related Art

In general, a pointing device for a computer is a peripheral device of the computer which indicates its location using a cursor. The pointing device is classified into a ball pointing device which detects motion thereof using a ball installed therein and an optical pointing device which detects motion thereof using reflectance of light irradiated from a light emitting diode installed therein.

The conventional optical pointing device, as shown in FIG. 1, includes a light emitting diode 6 installed inside a case 9 which has an opening portion 8 formed at a bottom portion thereof, a prism 7 for reflecting light irradiated from the light emitting diode 6, a lens 2 into which the light that is reflected from the prism 7 and then reflected by a pad or floor 3 is collected, an image sensor 5 for receiving the light collected by the lens 2, and a diaphragm 1 which is arranged below the image sensor 5 and shields stray light to thereby allow the image sensor 5 to receive the light collected on a significant surface of the lens 2.

Here, the diaphragm 1 is fixed below the image sensor 5.

In the conventional optical pointing device described above, the reflected amount of light irradiated from the light emitting diode 6 installed in the case 9 is collected by the lens 2, and the image sensor 5 receives the reflected amount of light through the diaphragm 1 to detect motion for an x axis and y axis directions of the optical pointing device.

However, the conventional optical pointing device has a disadvantage in that the diaphragm 1 should be remade to use different-shaped or different-sized lens 2 since the diaphragm 1 is fixed below the image sensor 5.

Also, since the diaphragm 1 is coupled to the image sensor 5 such that the diaphragm 1 and the lens 2 have a predetermined distance "d" therebetween, an optical angle that light can enter through the diaphragm 1 is increased as much as the distance "d" between the diaphragm 1 and the lens 2, so that a large amount of stray light may enter the image sensor 5 through the diaphragm 1.

That is, the optical angle is so large such that the light which enters through portions other than the significant surface of the lens 2 may be received by the image sensor 5, thereby increasing an error of motion for the x axis and y axis directions of the optical pointing device.

SUMMARY OF THE INVENTION

The present invention, therefore, solves aforementioned problems associated with conventional devices by providing an optical pointing device which installs a diaphragm at a location adjacent to a lens to thereby prevent stray light from entering the image sensor.

The present invention also provides an optical pointing device having a detachable diaphragm which is installed at a location adjacent to a lens such that installation location and distance of the lens and the diaphragm may be controlled according to a user's need.

In an exemplary embodiment of the present invention, an optical pointing device includes: a case having an opening portion formed on a bottom thereof; a light source installed in the case; an illuminating member for reflecting or directing light emitted from the light source to the exterior through one side of the opening portion of the case; a lens member installed in the case to collect the light which is reflected by the illuminating member and then is reflected from the exterior of the case to enter through the other side of the opening portion; an image sensor installed above the lens member to receive the collected light; and a masking member installed closely to the lens member and having a light collecting hole which exposes a significant surface of the lens member.

The masking member may be detachably installed.

The masking member may be installed below and above the lens member.

The masking member may be installed above the lens member.

The masking member may be installed below the lens member.

The masking member may be a taping member attached to the lens member.

A light shielding plate may be installed between one side and the other side of the opening portion.

The masking member may be formed to be extended to surround portions of the lens member except for the light collecting hole.

BRIEF DESCRIPTION OF THE DRAWINGS

The above and other features of the present invention will be described in reference to certain exemplary embodiments thereof with reference to the attached drawings in which.

DETAILED DESCRIPTION OF THE INVENTION

Figure 1:
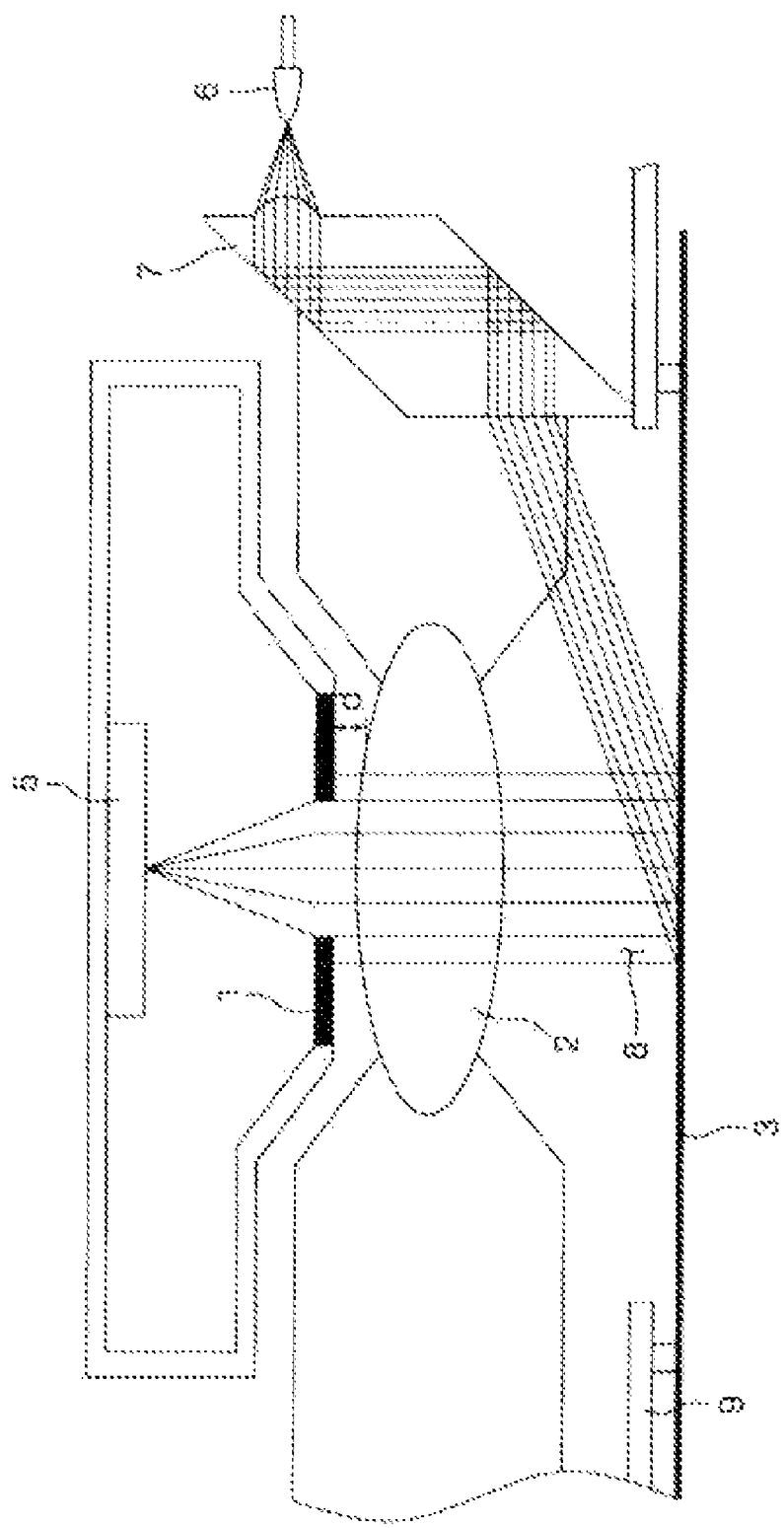
FIG. 1 is a perspective view illustrating a conventional optical pointing device.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
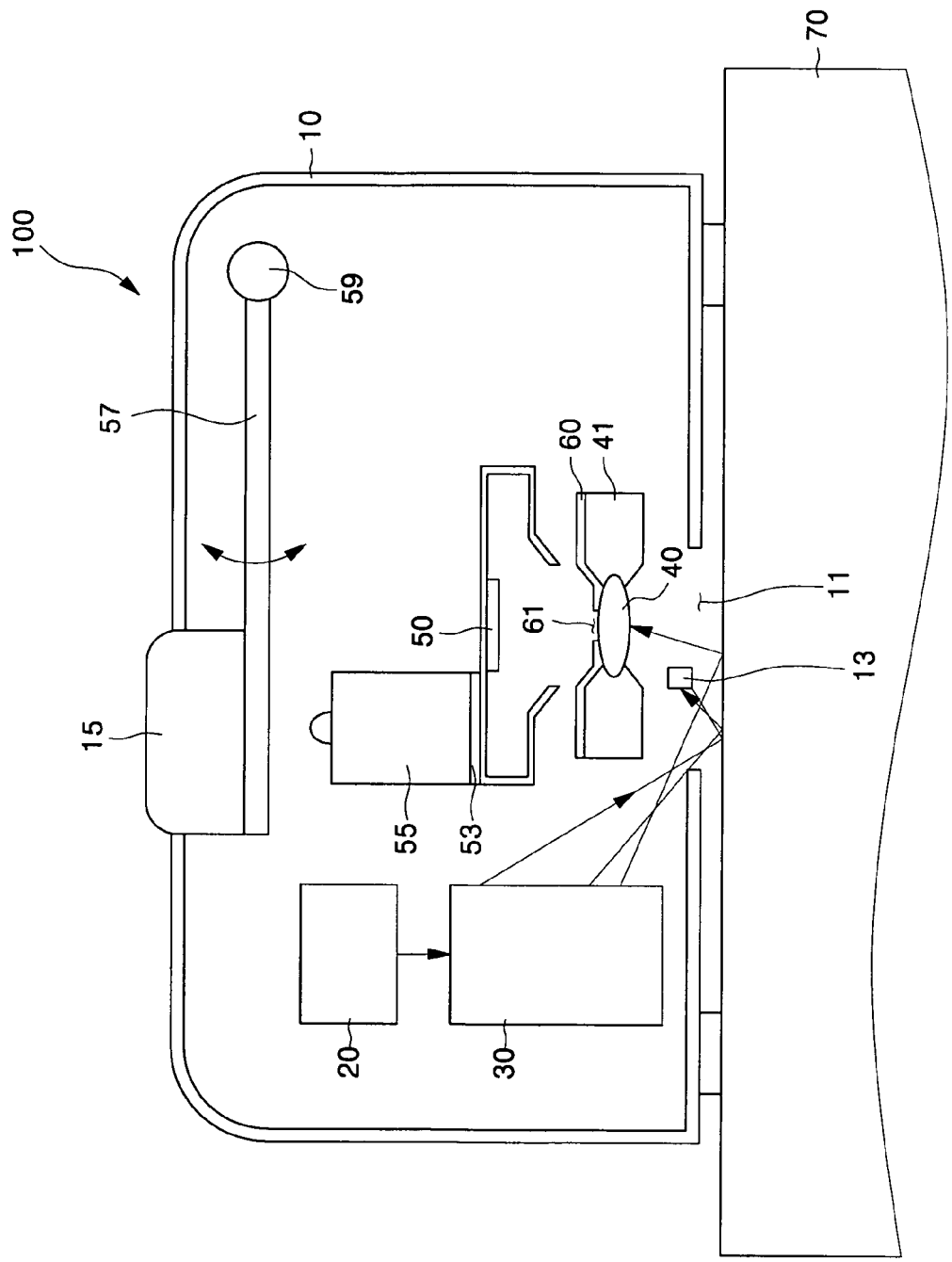
FIG. 2 is a schematic view illustrating an optical pointing device according to an embodiment of the present invention.

FIG. 2 is a schematic view illustrating an optical pointing device according to an embodiment of the present invention. The optical pointing device 100, as shown in FIG. 2, includes a case 10, a light source 20 installed in the case 10, an illuminating member 30, a lens member 40, an image sensor 50, and a masking member 60.

The case 10 has an opening portion 11 formed on a bottom thereof, and a lens fixing member 41 which is made of a transparent material is installed above the opening portion 11.

The lens member 40 for collecting light is installed in the lens fixing member 41, and the illuminating member 30 is installed on one side of the lens fixing member 41, and the light source 20 such as a light emitting diode is installed at a location adjacent to the illuminating member 30.

The masking member 60 having a light collecting hole 61 which exposes only a significant surface through which the light passes is installed in the lens member 40.

Here, the masking member 60 may be closely installed above, below, or both above and below the lens member 40.

In particular, in the case that the lens fixing member 41 is made of a transparent material, in order to prevent stray light from being collected to a side of the lens member 40 through the transparent lens fixing member 41, the masking member 60 may be installed below the lens member 40 such that the masking member 60 is formed to be extended to cover the an edge portion of the lens member 40 and the lens fixing member 41.

Also, since the masking member 60 should be detachably installed, it is preferably is a taping member attached to the lens member 40.

The opening portion 11 formed on the bottom of the case 10 is formed to allow the light reflected by the illuminating member 30 through one side thereof to go to and be reflected on a floor 70 contacting the bottom of the case 10 and then to be collected to the lens member 40 through the other side thereof.

Here, a light shielding plate 13 is installed between one side above which the illuminating member 30 is installed and the other side of the opening portion 11 above which the lens member 40 is installed.

That is, the light shielding plate 13 is arranged on the other side of the opening portion 11, in which the lens member 40 is installed, to surround the lens member 40 to thereby shield some of incident light from one side of the opening portion 11.

The image sensor 50 which is installed above the lens member 40 receives light collected through the lens member 40 to calculate the total quantity of light by comparing a picture prior to and a picture after movement of the optical pointing device, thereby detecting motion variation.

A switch module 55 is mounted on a printed circuit board 53 positioned at a predetermined area of the image sensor 50, a horizontal support 57 is installed above the switch module 55, and one side of the horizontal support 57 is coupled to a rotation axis 59 fixed in the case 10. A button 15 is installed on the other side of the horizontal support 57 to penetrate the upper portion of the case 10.

The horizontal support 57 has restoring force which occurs apart from the switch module 55 due to an elastic member (not shown).

Operation and effect of the optical pointing device of the present invention are explained below.

Light generated from the light source 20 is incident to and reflected by the illuminating member 30 to go the exterior through one side of the opening portion 11 at the bottom surface of the case 10.

Then, the resultant light is incident into a floor 70 on which the optical pointing device is mounted, reflected on the floor 70 at different incident angles because of non-uniform roughness of the floor 70, and enters the lens member 40 through the other side of the opening portion 11 to be collected.

Figure 3:
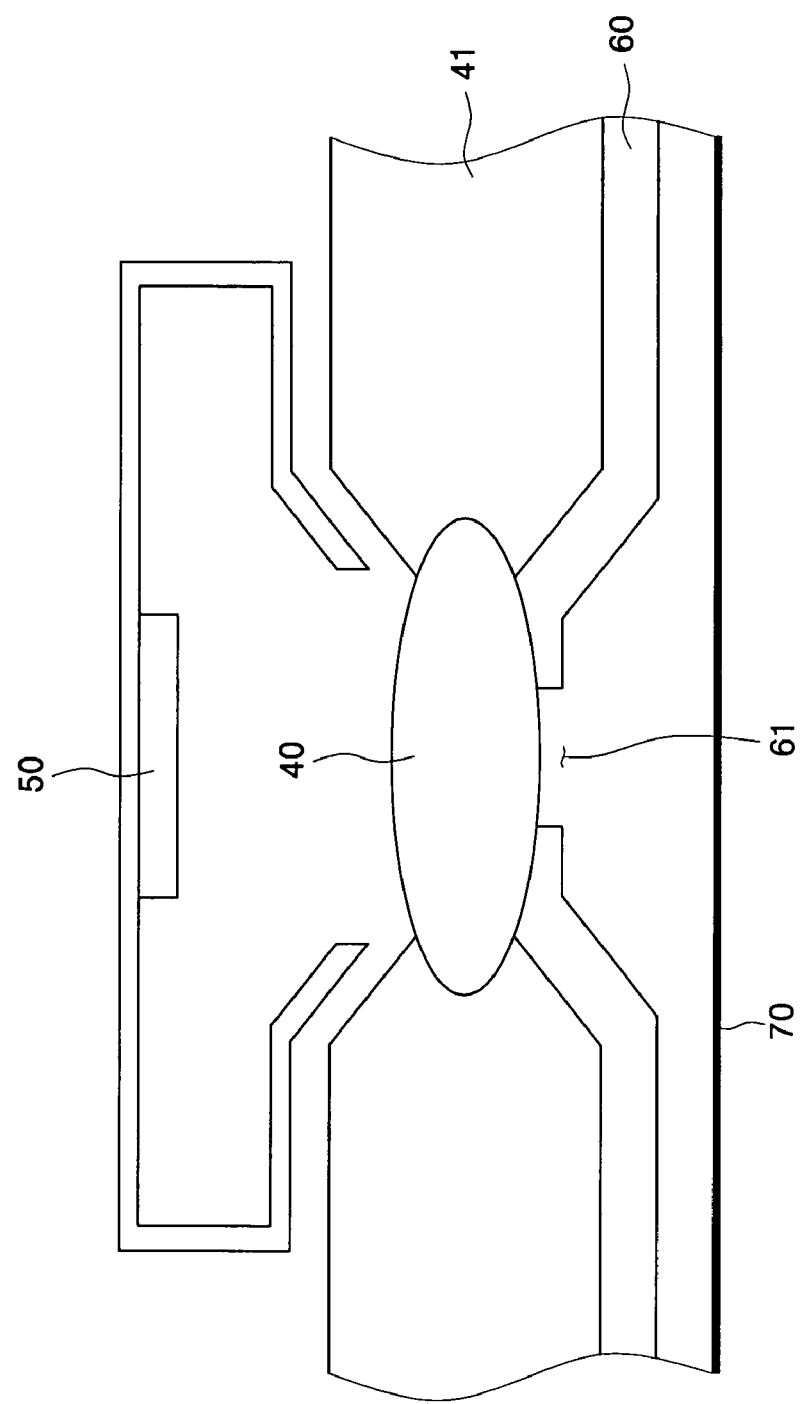
FIGS. 3 and 4 are schematic views illustrating an optical pointing device according to other embodiments of the present invention.
Figure 4:
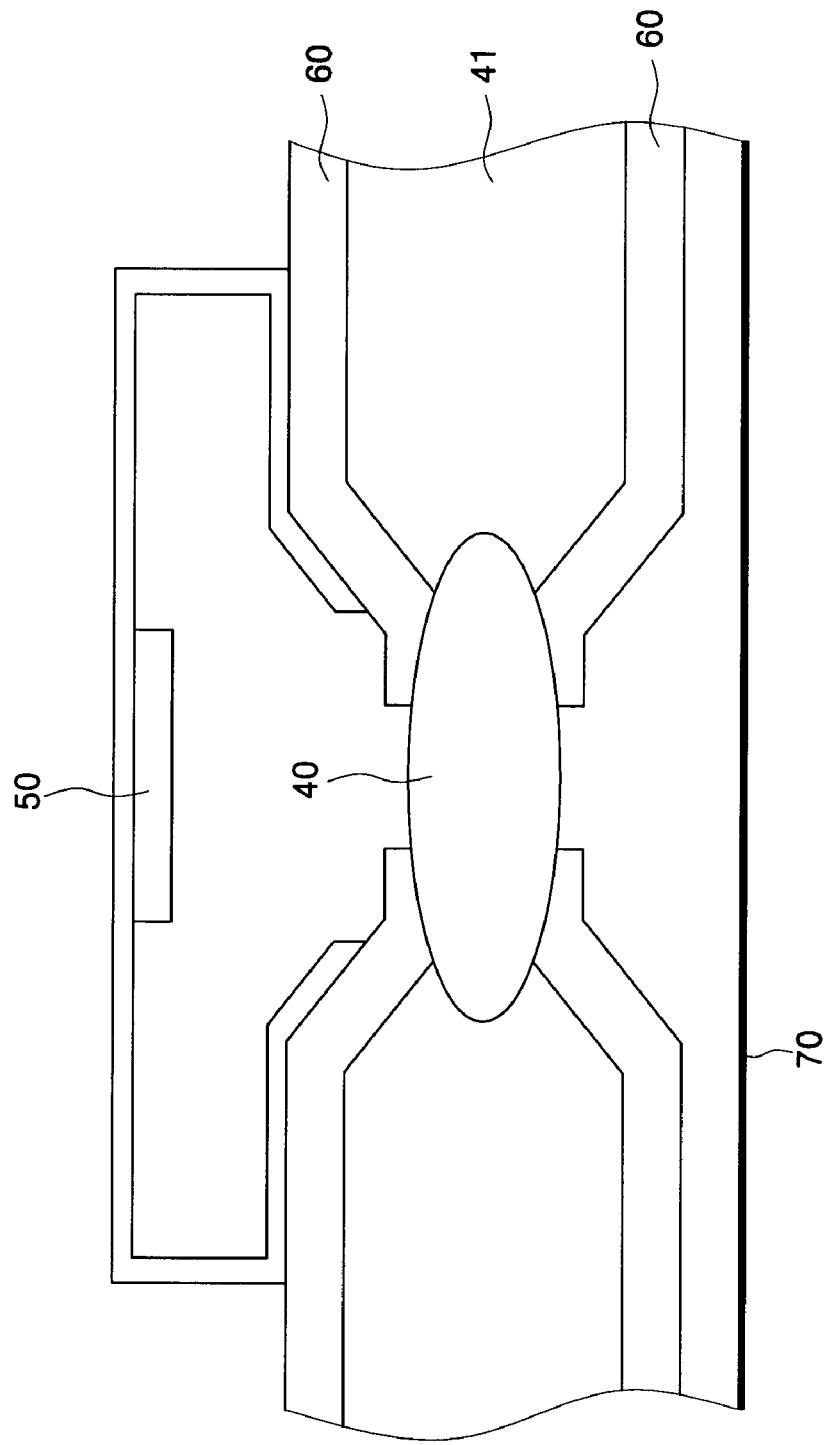

At this time, the masking member 60 is arranged above the lens member 40, closely below the lens member 40 as shown in FIG. 3, or both above and below the lens member 40 as shown in FIG. 4 such that light can be collected only through the significant surface of the lens member 40.

Some of light reflected on the floor 70 is shielded by the light shielding plate 13 installed between one side and the other side of the opening portion 11, and for the light incident into the case 10, only the quantity of light corresponding to the significant surface is collected to the lens member 40 through the light collecting hole 61 which is formed in the masking member 60 installed closely to the lens member 40.

Stray light is shielded by the masking member 60, and the light collected by the lens member 40 is received by the image sensor 50. The image sensor 50 optically obtains variation on the quantity of received light with respect to continuous variation of a sensed surface of the floor 70 and mathematically calculates a motion value to thereby detect movement of the optical pointing device for the x axis and y axis directions and output resultant signals. A cursor moves on a display device of the computer in the x or y axis direction in response to the output signal.

That is, whenever a user pushes the button 15 of the optical pointing device 100, the horizontal support 57 rotates, so that the switch module 55 is turned on. Thus, if the button 15 is pushed, a cursor located at a position corresponding to an optical signal outputted from the image sensor 50 activates an operation depending upon content under cursor location.

As described above, the optical pointing device has the masking member and the lens member which are installed closely to prevent stray light from entering a portion between the masking member and the lens member, whereby the error range of variation detected by the image sensor which results from stray light is reduced, and thus there is an effect in that operating speed of the cursor based on the motion of the optical pointing device becomes accurate.

Also, since the masking member is detachably installed close to the lens member, this can be applied to the existing optical pointing device, thereby reducing the development cost of the optical pointing device according to a height change of the lens member.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An optical pointing device comprising:
   a case having an opening portion formed at a bottom surface thereof;
   a light source installed in the case;
   an illuminating member for reflecting or directing light emitted from the light source to the exterior of the case through the opening portion of the case, the illuminating member being installed beneath the light source along a path of the light;
   a light shielding plate shielding a portion of beams of the light reflected from a floor beneath the case and entering into the interior of the case, the light shielding plate being installed beneath the illuminating member along the path of the light in the case;
   a lens member installed above the light shielding plate to collect the remaining portion of the beams of the light, wherein both sides of the lens member are covered by a lens fixing member, opposite portions of the lens member are exposed by the lens fixing member, the lens fixing member is spaced away from the opening portion of the case and the lens fixing member is installed above the light shielding plate;

a masking member installed closely to the lens member and the lens fixing member and exposing one of the opposite portions of the lens member, the masking member being installed above the light shielding plate and the masking member transmitting the remaining portion of the beams of the light; and an image sensor installed above the masking member to overlap the one of the opposite portions of the lens member through the masking member and receive the remaining portion of the beams of the light, wherein the lens fixing member and the masking member are confined to be adjacent to the opening portion of the case.

2. The device of claim 1, wherein the masking member is detachably installed to cover the lens fixing member and the lens member.

3. The device of claim 1, wherein, when the lens fixing member is formed of a transparent material, the masking member is installed below or above the lens member and a portion of the lens fixing member.

4. The device of claim 1, wherein, when the lens fixing member is formed of a transparent material, the masking member is installed above the lens member and a portion of the lens fixing member.

5. The device of claim 1, wherein, when the lens fixing member is formed of a transparent material, the masking member is installed below the lens member and a portion of the lens fixing member.

6. The device of claim 1, wherein the masking member is a taping member aft ached to the lens member such that the taping member has a light collecting hole corresponding to the one of the opposite portions of the lens member.

7. The device of claim 1, wherein the light shielding plate is installed to surround the lens member.

8. The device of claim 2, wherein the masking member is a taping member attached to the lens member.

* * * * *